US009389667B2

(12) United States Patent
Horiuchi et al.

(10) Patent No.: US 9,389,667 B2
(45) Date of Patent: Jul. 12, 2016

(54) SHORTENING RESUME TIME FROM A POWER-SAVING STATE

(71) Applicant: LENOVO (Singapore) PTE, LTD., New Tech Park (SG)

(72) Inventors: Yasuhiro Horiuchi, Yamato (JP); Ken Sasaki, Machida (JP); Hiroyuki Uchida, Sagamihara (JP); Masaki Ohshima, Hadano (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 233 days.

(21) Appl. No.: 14/074,535

(22) Filed: Nov. 7, 2013

(65) Prior Publication Data

US 2014/0143572 A1    May 22, 2014

(30) Foreign Application Priority Data

Nov. 16, 2012 (JP) ................................ 2012-251744

(51) Int. Cl.
*G06F 1/32* (2006.01)
*G06F 9/44* (2006.01)

(52) U.S. Cl.
CPC ............ *G06F 1/3203* (2013.01); *G06F 1/3268* (2013.01); *G06F 9/4418* (2013.01); *Y02B 60/1246* (2013.01); *Y02B 60/186* (2013.01)

(58) Field of Classification Search
CPC .............. G06F 1/32; G06F 1/28; G06F 1/26; G06F 1/00
USPC ......... 713/300, 310, 320, 321, 322, 323, 324, 713/330, 340, 375
See application file for complete search history.

(56) References Cited

U.S. PATENT DOCUMENTS

| 5,339,444 | A | * | 8/1994 | Nakajima | ................ 713/100 |
| 5,860,083 | A | * | 1/1999 | Sukegawa | ............ G06F 12/08 711/103 |
| 7,380,148 | B2 | * | 5/2008 | Montero | ............ G06F 9/4406 713/323 |
| 2005/0166078 | A1 | * | 7/2005 | Taniguchi | ............ G06F 1/3203 713/330 |
| 2005/0204181 | A1 | * | 9/2005 | Montero | ............ G06F 9/4406 714/4.2 |
| 2006/0224880 | A1 | * | 10/2006 | Hara et al. | ................ 713/2 |
| 2008/0098100 | A1 | * | 4/2008 | Zimmerman | .......... H04L 67/06 709/222 |
| 2009/0193156 | A1 | * | 7/2009 | Suematsu | ................ 710/14 |
| 2011/0246138 | A1 | * | 10/2011 | Chung | ............ G06F 13/4072 702/186 |
| 2011/0252225 | A1 | * | 10/2011 | Liu | ............ G06F 9/4418 713/2 |
| 2013/0262898 | A1 | * | 10/2013 | Preston | ............ G06F 9/4418 713/323 |

FOREIGN PATENT DOCUMENTS

| JP | 11-272348 | 10/1999 |
| JP | 2003-233969 | 8/2003 |

(Continued)

*Primary Examiner* — Jaweed A Abbaszadeh
*Assistant Examiner* — Keshab Pandey
(74) *Attorney, Agent, or Firm* — Kunzler Law Group

(57) ABSTRACT

A computer implemented method resumes a computer from a power-saving state in a short time. Prior to shifting to a power-saving state, a drive sets a status flag indicating a loading state of a disk at a flash memory. For resumption from the power-saving state, the BIOS requests a ready notification from the drive. When it is determined that the status flag indicates not-loading of a disk, the drive skips the detection processing of the disk including initialization of a read/write circuit and a servo mechanism such as a spindle motor and sends a ready notification indicating not-loading of the disk to the BIOS. Receiving the ready notification, the BIOS can continue the resume processing.

20 Claims, 8 Drawing Sheets

(56) References Cited

FOREIGN PATENT DOCUMENTS

| JP | 2008040948 | 2/2008 |
|----|------------|--------|
| JP | 2010009453 | 1/2010 |
| JP | 2011-134373 | 7/2011 |
| JP | 2012-097373 | 5/2012 |

* cited by examiner

SHORTENING RESUME TIME FROM A POWER-SAVING STATE

FIELD

The subject matter disclosed herein relates a technique to shorten time to resume a computer from a power-saving state, and more particularly relates to a technique to shorten time to resume a computer connected to a removable medium device to which a removable medium is loadable.

BACKGROUND

A mobile computer such as a laptop personal computer (laptop PC) or a tablet device transitions from a power-on state to a power-saving state such as a suspend state or a hibernation state to lengthen operation time by a battery. For transitioning to the hibernation state, a system context of each device and a content stored in a main memory in the power-on state (hibernation data) are stored in a disk drive such as a hard disk drive (HDD) or a solid state drive (SSD) and then electricity to most of the devices is stopped. Then to resume the power-on state, the hibernation data is restored to the original positions from the disk drive, and thus the resume time can be shortened compared with the case of starting from the power-off state.

For resumption, power is turned on at all devices. Firstly, the BIOS initializes the devices where the supplying of power has been stopped, the initialization including detection and inspection of the devices, parameter setting and the like. The devices inspect themselves if needed, and when the devices become accessible by the system, the devices send a ready notification to the BIOS. When receiving such a ready notification from every device and completing the resume process for hardware, the BIOS passes the control of the resume process to the operating system (OS). If there is a device, from which the BIOS does not receive a ready notification after the elapse of predetermined time, the resume time will be delayed because the initialization of such a device is skipped and control is passed to the OS. The BIOS cannot access the device that does not send a ready notification.

DETAILED DESCRIPTION

[Configuration of Laptop PC]

Figure 1:
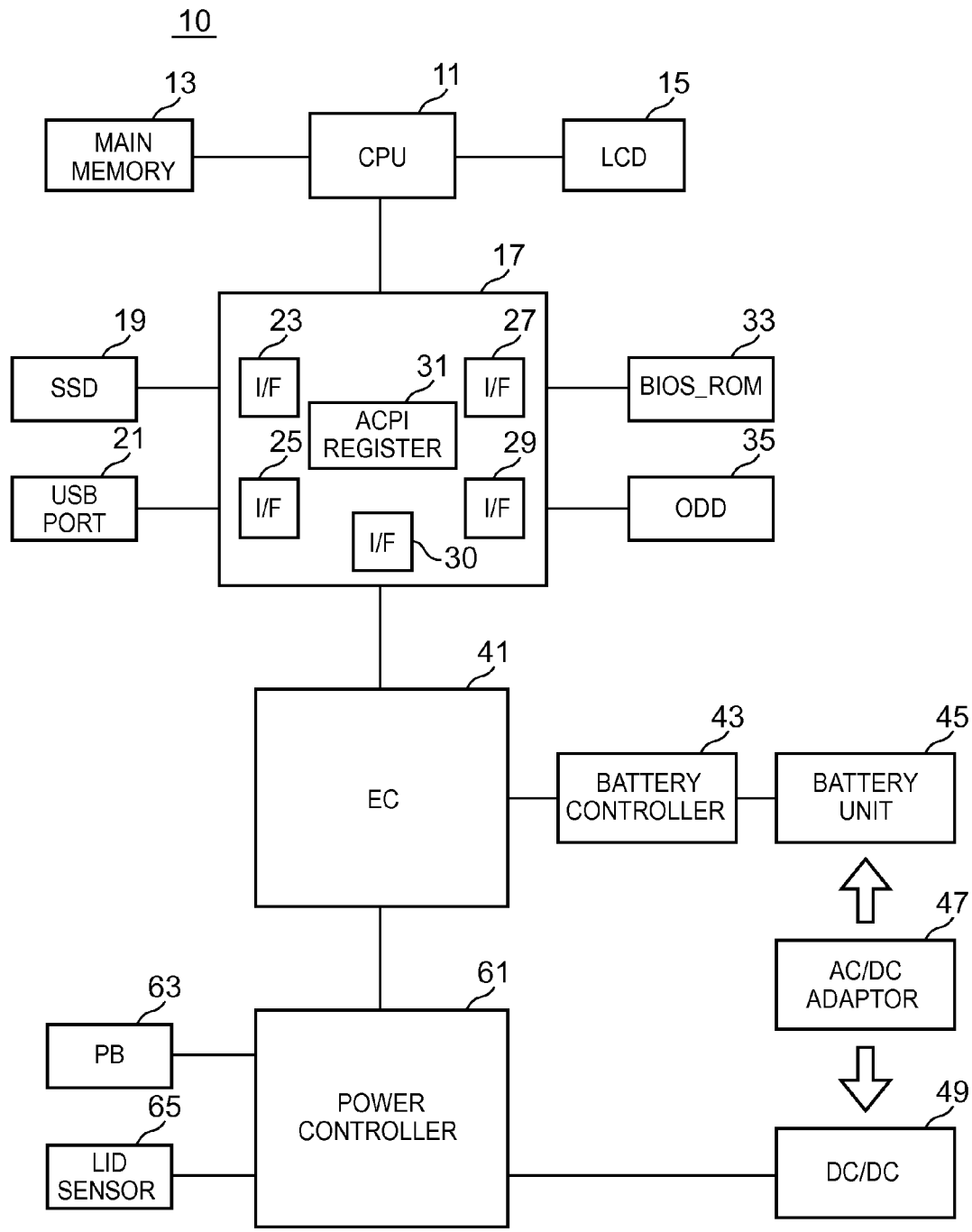
FIG. 1 is a functional block diagram to describe an exemplary hardware configuration of a laptop PC.

FIG. 1 is a functional block diagram to describe an exemplary hardware configuration of a laptop PC 10. Since the configuration of many hardware components is known, the following describes the range necessary to understand the present invention. To begin with, the laptop PC 10 has the following power states. The laptop PC 10 has power-saving functions of Advanced Configuration and Power Interface (ACPI). The ACPI defines four sleeping states (power-saving states) from S1 state to S4 state, S0 state (power-on state) and S5 state (power-off state).

Among the sleeping states of ACPI, the laptop PC 10 in one example defines S3 state and S4 state only, but may define other sleeping states. In a sleeping state, the power supply of a CPU 11 stops. In S3 state (suspend state), the content stored in a main memory 13 is held, and the power supply of devices that are not necessary to hold the content stored in the main memory 13 stops. Before entering a suspend state, the OS saves a system context held by a device whose power supply is to be stopped in the main memory 13, and when the laptop PC returns to a power-on state, the OS restores such a context to the corresponding device.

S4 state (hibernation state) takes the longest time to start the computer among the sleeping states supported by ACPI, and consumes the least amount of electricity. For transition from the power-on state to the hibernation state of the laptop PC 10, the OS stores hibernation data stored in the main memory 13 in a SSD 19, and then stops the power supply of devices other than devices necessary to start the power supply such as a power controller 61.

S5 state is called soft-off as well, and basically has the same range to supply electricity to devices as that of the hibernation state other than that the OS does not store the hibernation data in the SSD 19. Herein, the hibernation state of the present invention includes a state where the BIOS automatically makes the computer transition to the hibernation state when predetermined time has elapsed from the transitioning to S3 state by the OS. In this case, although the OS recognizes the state as transitioning to the suspend state, the actual state of electricity is a hibernation state.

To a chip set 17, the CPU 11, the SSD 19, a USB port 21, a BIOS_ROM 33, an ODD 35 and an embedded controller (EC) 41 are connected. To the CPU 11, the main memory 13 and a LCD 15 are connected. The chip set 17 is equipped with interface functions of various standards, and FIG. 1 shows a typical case where SAT controllers 23 and 29 are connected to the SSD 19 and the ODD 35, a USB controller 25 is connected to the USB port 21, a SPI 27 is connected to the BIOS_ROM 33 and a LPC 30 is connected to the EC 41. The chip set 17 includes an ACPI register 31 to control the power state.

The ACPI register 31 allows the OS to set a flag indicating the power state as the transitioning target when transitioning is performed from the power-on state to any power-saving state. The SSD 19 is a large-capacity storage device (disk drive) to store the OS, device drivers, application programs, user data and the like. The SSD 19 has a MBR or a boot sector, and typically operates as a boot drive. To the USB port 21, an external USB device such as a semiconductor memory, a hard disk drive or a FDD is connected.

The BIOS_ROM 33 stores system BIOS including a code to execute Power On Self Test (POST) for transitioning from the power-off state or the power-saving state to the power-on state. Instead of the system BIOS, Extensible Firmware Interface (EFI) or Unified EFI (UEFI) may be used. In the present specification, such firmware stored in a nonvolatile memory such as the BIOS_ROM 33 and executing resume process such as POST is simply called BIOS. The configuration of the ODD 35 is described later with reference to FIG. 2.

To the EC 41, a battery controller 43 and the power controller 61 are connected. The EC 41 is a microcomputer including a MPU, a ROM storing firmware executed by the MPU, a RAM offering a working area of the MPU, an EEPROM and the like. To the battery controller 43, a battery unit 45 is connected, including a lithium-ion type battery cell, a protection circuit and the like. The battery controller 43 is a micro-controller to calculate the remaining capacity of the battery cell or to manage the safety during charging/discharging. The battery controller 43 and the battery unit 45 may be configured as a battery pack that is compatible with the standard of a smart battery system (SBS).

To the power controller 61, a power button 63, a lid sensor 65 and a DC/DC converter 49 are connected. The lid sensor 65 is a switch that operates in response to opening and closing of the LCD casing. The power controller 61 is a wired logic digital control circuit (ASIC) that controls the operation of the DC/DC converter 49 in accordance with an instruction from the EC 41, pressing of the power button 63 and the operation of the lid sensor 65.

The DC/DC converter 49 converts DC voltage supplied from an AC/DC adaptor 47 or the battery unit 45 into a plurality of voltages necessary to operate the laptop PC 10, and supplies electricity to each device based on the electricity supply classifications defined corresponding to the power states. The AC/DC adaptor 47 charges the battery unit 45 and supplies electricity to the DC/DC converter 49. When the AC/DC adaptor 47 is not connected, the battery unit 45 supplies electricity to the DC/DC converter 49.

Figure 2:
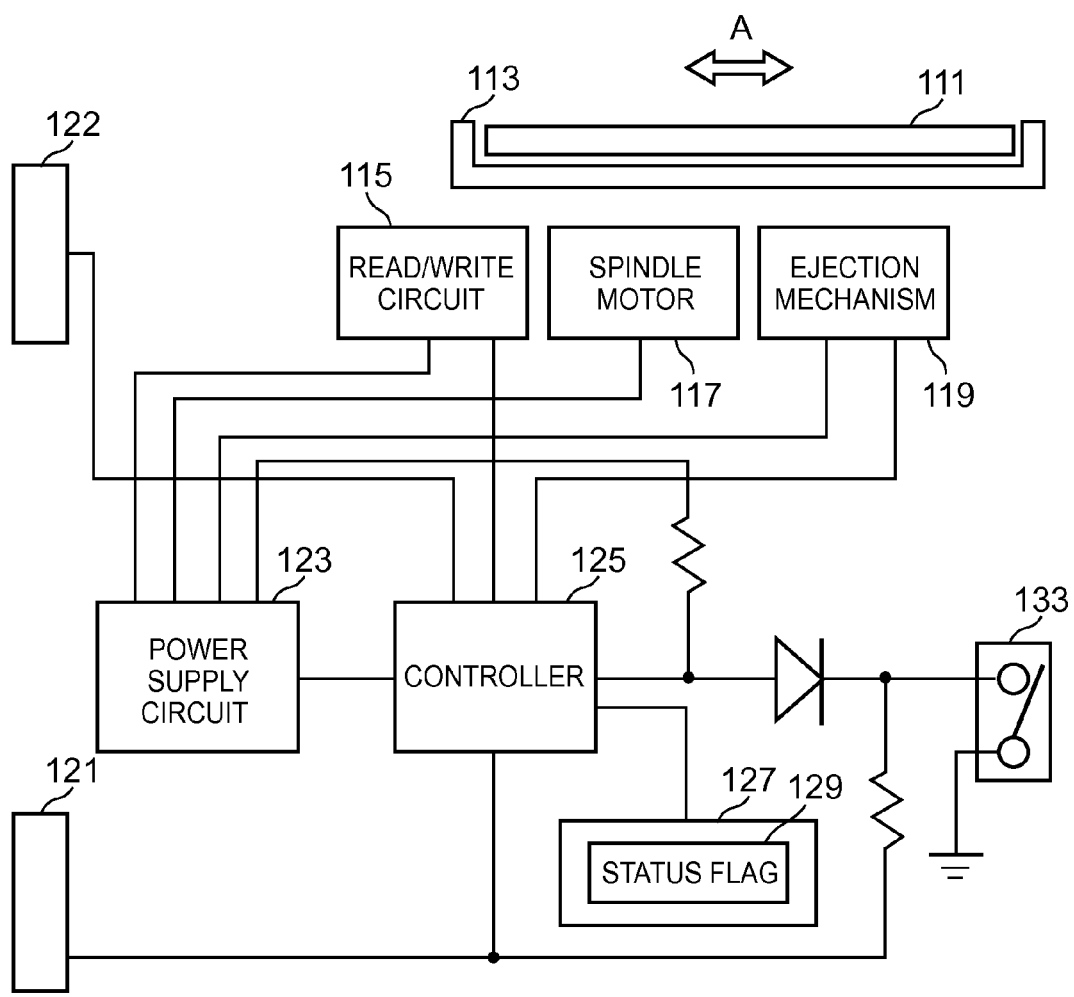
FIG. 2 is a functional block diagram to describe an exemplary hardware configuration of an ODD.

FIG. 2 is a block diagram to describe an exemplary hardware configuration of the ODD 35. The ODD 35 in one example is mounted at the case of the laptop PC 10. The ODD 35 is connected to the controller 29 at a signal terminal 122 and is connected to the DC/DC converter 49 at a power supply terminal 121. The ODD 35 is a tray-loading type, and includes a tray 113 to store a disk 111 removably. The ODD in the present invention may be a slot-loading type configured to directly push a disk inside the housing. An ejection mechanism 119 includes a motor-driven mechanism to eject the tray 113 from the housing of the ODD 35 as indicated with the arrow A and move it to an open position or to move a disk stored inside the housing to the close position. The ejection mechanism 119 detects the position of the tray 113 and sends a signal indicating the open position or the close position to a controller 125.

When the tray 113 moves to the close position, the controller 125 activates a read/write circuit 115 and a spindle motor 117 for access to the disk 111. When the tray 113 to store the disk 111 moves to the close position, the spindle motor 117 rotates the disk 111 in accordance with a read/write command from the CPU 11.

The read/write circuit 115 includes a laser emission part, an optical mechanism, a focus mechanism, a tracking mechanism and a data signal processing circuit. The read/write circuit 115 further includes a disk detection circuit to detect the storage of the disk 111 in the tray 113, and when the disk 111 is not loaded, the read/write circuit 115 sends a signal indicating that no disk is loaded to the CPU 11 via the controller 125. A power supply circuit 123 supplies electricity, which is supplied from the DC/DC converter 49, to each device of the ODD 35. The controller 125 includes an interface circuit for SATA for data transfer with the CPU 11 via the chip set 17, a control circuit to control devices in the ODD 35, a processor, firmware, and a memory, for example.

To the controller 125, a flash memory 127 is connected. Every time when the tray 113 moves from the open position to the close position, the controller 125 inspects the loading state of the disk 111 via the read/write circuit 115, and when the disk 111 is loaded, the controller 125 sets a status flag 129 at the flash memory 127. Every time when the tray 113 moves to the open position, the controller 125 resets the status flag 129. When receiving a signal indicating the open position of the tray 113 from the ejection mechanism 119, the controller 125 notifies the system of the signal.

An eject button 133 is provided at the housing of the ODD 35. When a user operates the eject button 133 of the ODD 35 receiving electricity, an eject signal is supplied to an eject terminal of the controller 125. When recognizing the eject signal, the controller 125 controls the ejection mechanism 119 unless the OS does not inhibit the ejection, thus moving the tray 113 to the open position. When a user gently pushes the tray 113 at the open position, the ejection mechanism 119 returns the tray 113 to the close position.

[Procedure for Resumption]

Figure 3:
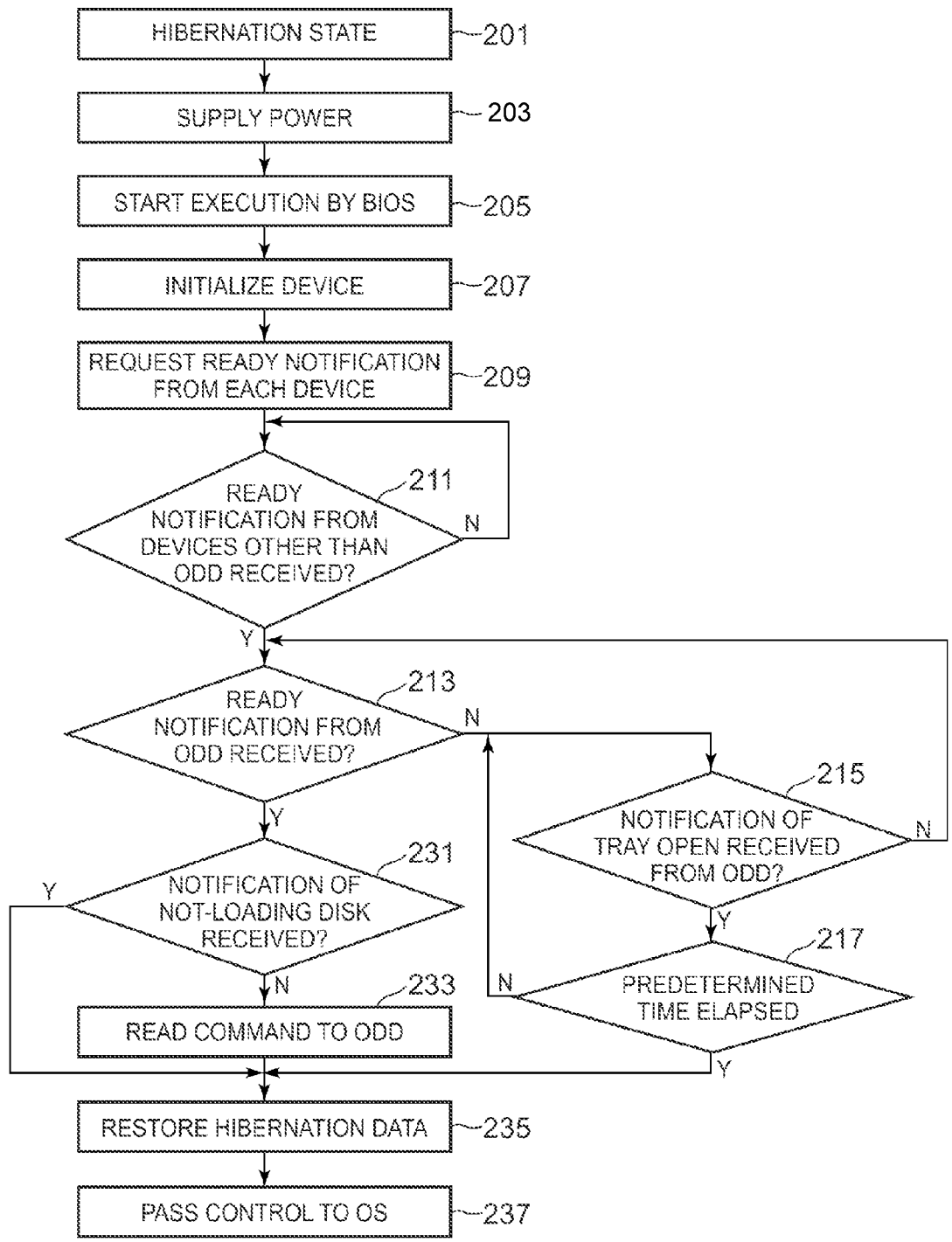
FIG. 3 is a flowchart to show the procedure executed by the BIOS when the laptop PC in the hibernation state resumes.
Figure 4:
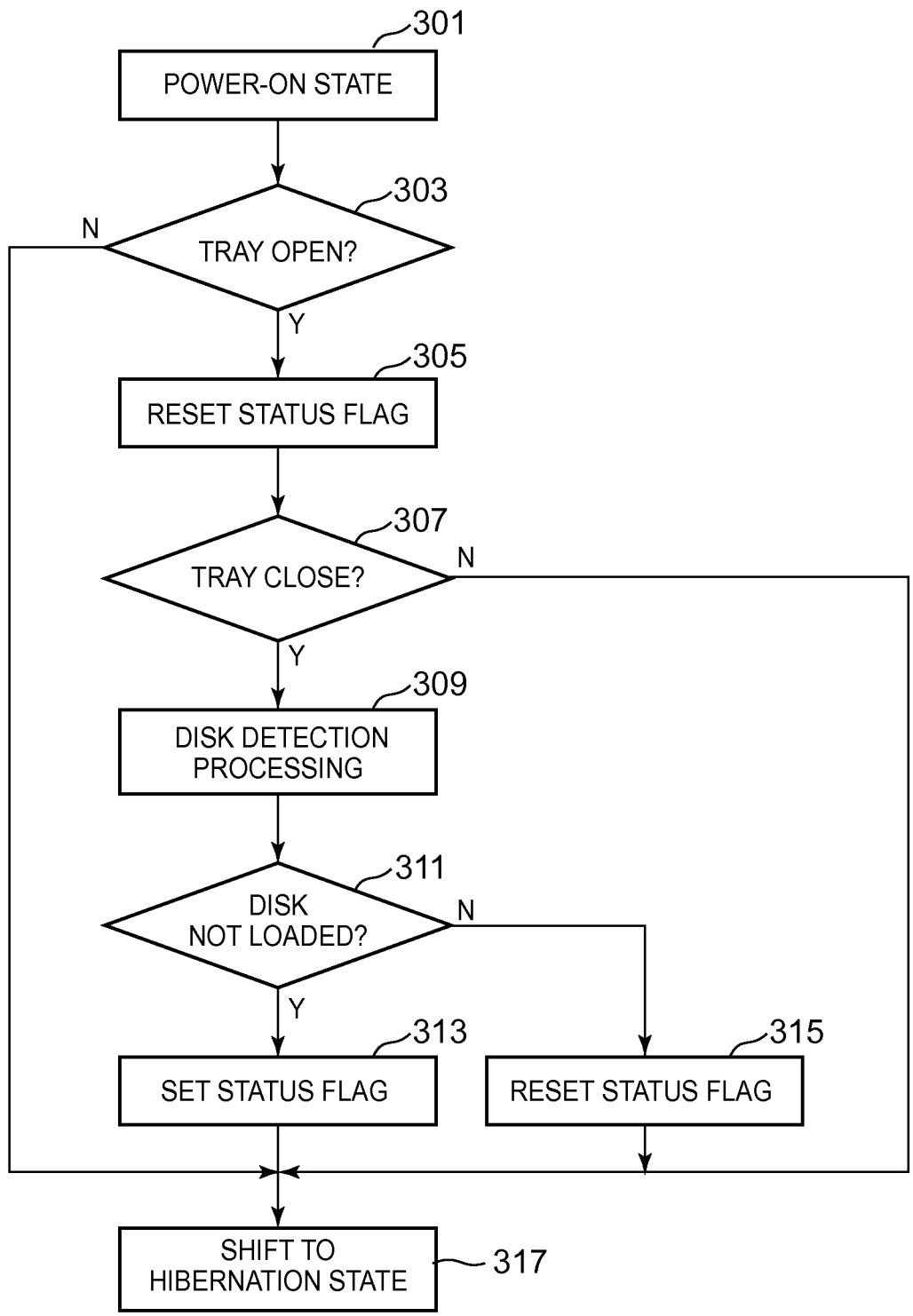
FIG. 4 is a flowchart showing the operation procedure when the ODD sets a status flag at an internal flash memory.
Figure 5:
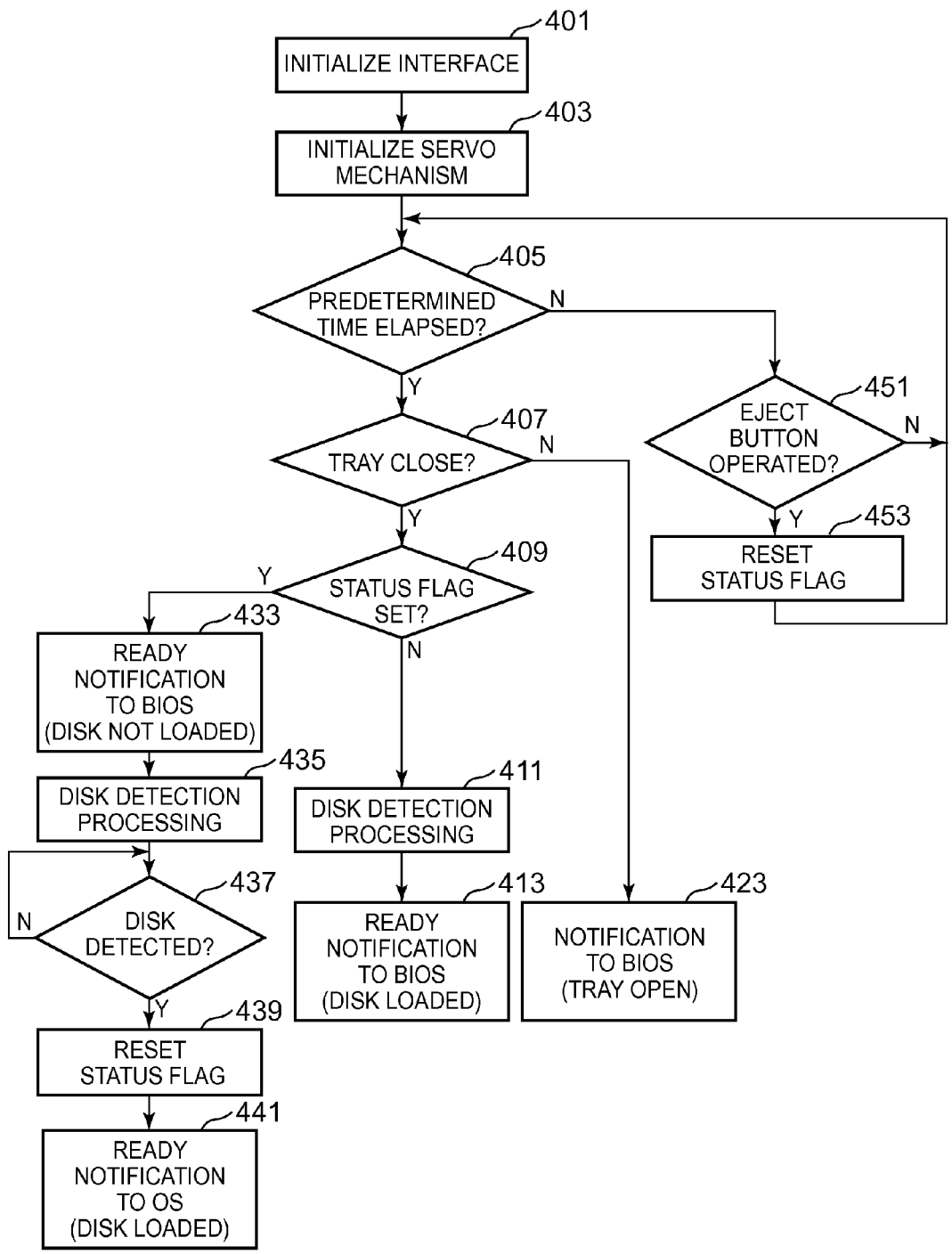
FIG. 5 is a flowchart showing the operation procedure of the ODD when the laptop PC in the hibernation mode resumes.

FIGS. 3 to 5 are flowcharts to describe the procedure to shorten the resume time using the status flag 129. FIG. 3 is a flowchart to show the procedure executed by the BIOS when the laptop PC 10 in the hibernation state resumes. At block 201, the laptop PC 10 transitions to the hibernation state, and a flag is set at the ACPI register 31, indicating that the current power state is the hibernation state. The ODD 35 may be loaded with any disk of a boot disk including Master Boot Recode (MBR) or a boot sector or another normal disk not including it or may not be loaded with any disk. In the power-saving state such as the hibernation state or the suspend state, electricity at least to the CPU 11 and the ODD 35 is stopped.

Parameters set at peripheral devices such as various controllers of the chip set 17 and the ODD 35 in the power-on state are stored in any nonvolatile memory when the laptop PC transitions to the hibernation state. Data in the main memory 13 including a system context in the power-on state is saved as hibernation data in the SSD 19.

At block 203, when the power button 63 is pressed or when the lid sensor 65 operates, then the power controller 61 activates the DC/DC converter 49 to supply electricity to devices that have stopped. At block 205, the CPU 11, to which electricity is supplied, is reset. The CPU 11 accesses predetermined reset vector of the BIOS_ROM 33 and fetches an instruction. When the CPU 11 completes basic initialization of the devices and the main memory 13 becomes accessible, then the CPU 11 loads the BIOS from the BIOS_ROM 33 and parameters from the nonvolatile memory to the main memory 13.

The BIOS refers to the ACPI register 31 and understands that the transition source of the resumption this time is the hibernation state. Then, the BIOS decides the execution path of POST. The execution path of POST depends on its transition source. When the transition source is the power-off state, complete POST including the selection of an optimum parameter is performed. When the transition source is the power-saving state such as the suspend state or the hibernation state, then POST simplified corresponding to the state is performed to shorten the resume time. Herein, POST of the ODD using the status flag 129 described later can be applied to any power-saving state as the transition source.

At block 207, the BIOS initializes loaded devices including detection, inspection, parameter setting and the like. For transitioning from the power-off state to the power-on state, an optimum parameter is selected, which is determined based on information acquired from the devices and performance of the controller. For resumption from the power-saving state, however, parameters read from a nonvolatile memory are restored to the corresponding devices and inspections are simplified, whereby the initialization can be completed in a short time.

When the SATA interface of the controller 125 is initialized and then the control is passed to the OS, the BIOS allows the system to recognize the ODD 35. Then each device subjected to initialization by the BIOS starts its own inspection independently to enable the usage by the system. For the ODD 35, the controller 125 initializes the read/write circuit 115 and the servo mechanism such as the spindle motor 117 and activates them, and then the ODD 35 inspects whether the disk 111 is loaded or not on the tray 113. Herein, the ODD 35 does not distinguish types of the disk 111 such as between a disk for boot and other disks.

At block 209, the BIOS requests, from each device, a ready notification indicating the accessibility of the device or waits for a ready notification from each device. The devices perform their independent inspections mutually in parallel, and when they become accessible from the system, send a ready notification to the BIOS. Since the ODD 35 requires the initialization and the operation of the servo mechanism to inspect the loading state of the disk 111, it takes longer time to issue a ready notification than other devices. In typical procedure, at block 211, all devices other than the ODD 35 send a ready notification to the BIOS. At block 213, if the BIOS does not receive a ready notification from the ODD 35, the procedure shifts to block 215, and when the BIOS receives a ready notification, the procedure shifts to block 231.

The BIOS cannot advance the resume process further unless it receives a ready notification from all devices including the ODD 35. A conventional ODD 35 inspects the loading state of the disk 111 regardless of the actual loading state of the disk 111 and sends any one of a ready notification indicating loading and a ready notification indicating not-loading to the BIOS. On the other hand, as described referring to FIGS. 4 and 5, the ODD 35 in the present embodiment at this time can send a ready notification indicating not-loading in a short time without inspecting the loading state of the disk 111.

At block 231, if the BIOS receives a ready notification indicating the loading of the disk 111 from the ODD 35, the procedure shifts to block 233. At block 233, the BIOS sends a read command to the ODD 35 to inspect whether the disk 111 is a boot disk or not. When the disk 111 is a boot disk and the ODD 35 has a higher rank among the devices as the boot drive candidates, then the BIOS starts boot from the ODD 35 without restoring the hibernation data.

As a result, the laptop PC 10 can boot from the ODD 35 loaded with a boot disk for recovery. When the BIOS determines that the disk 111 is not a boot disk, then the procedure shifts from block 233 to block 235. At block 231, when the BIOS receives a ready notification indicating not-loading of the disk 111 from the ODD 35, the procedure skips block 233 and shifts to block 235.

As described in FIG. 5, time to receive a ready notification indicating not-loading of the disk 111 is shorter than time to receive a ready notification indicating loading of the disk 111. At block 235, the BIOS accesses the SSD 19 to restore the hibernation data to the main memory 13, and then at block 237, the control is passed to the OS. When the OS restores a system context used before transitioning to the hibernation state to the corresponding devices, then the laptop PC shifts to the operation environment before transitioning to the hibernation state.

Electricity supplied to the ODD 35 during resumption enables a user to operate the eject button 133 to move the tray 113 to the open position. When the tray 113 is at the open position, the loading state of the disk is not decided, and so the ODD 35 cannot send any ready notification both for the disk loading and not-loading. When the tray 113 is at the open position, the ODD 35 sends an open notification to the BIOS.

At blocks 215 and 217, the BIOS monitors the elapsed time since the BIOS receives the open notification from the ODD 35. When the tray 113 is at the close position, then any ready notification will be sent from the ODD 35 soon, and so the procedures shifts to block 213. When it is determined that certain time or longer has passed since the BIOS receives the open notification, the BIOS regards it as not-loading of the disk 111, and at block 235, the BIOS restores hibernation data stored in the SSD 19 to the main memory 13. The procedure of FIG. 3 shows that the time before the BIOS receives a ready notification from the ODD 35 is a bottleneck in the overall resume time.

[Setting of Status Flag]

FIG. 4 is a flowchart showing the operation procedure when the ODD 35 sets a status flag 129 at the flash memory 127. Firmware of the controller 125 sets the status flag 129. At block 301, the laptop PC 10 is in the power-on state, and power is turned on at the ODD 35. The tray 113 is at the close position and the disk 111 is loaded or not loaded. The status flag 129 is set in the history and shows a not-loading state of the disk 111 or is reset and shows a loading state of the disk 111.

At block 303, a user operates the eject button 133 to load or eject the disk 111 to move the tray 113 to the open position. When the tray 113 moves to the open position, the controller 125 issues an open notification to the BIOS or the OS. When the tray 113 keeps the close position, the status flag 129 is not changed, and the procedure shifts to block 317. When the tray 113 moves to the open position, the loading state of the disk 111 is not decided, and so the controller 125 resets the status flag 129 once at block 305.

At block 307, a user pushes the tray 113 inside to return it to the close position or keeps the open position. When the tray 113 keeps the open position, the procedure shifts to block 317. When detecting the movement of the tray 113 to the close position, at block 309, the controller 125 activates the read/write circuit 115 and the spindle motor 117 to detect the loading state of the disk 111. At block 311, when the controller 125 determines that the disk 111 is loaded, then the procedure shifts to block 315 to reset the status flag 129, and the procedure shifts to block 317.

When the controller 125 determines at block 311 that the disk 111 is not loaded, the procedure shifts to block 313. At block 313, the controller 125 sets the status flag 129 and then the procedure shifts to block 317. At block 317, trigger for transitioning to the hibernation state is generated by pressing the power button 63, operation of the lid sensor 65 or the operation with a GUI icon.

When detecting the trigger, the OS notifies application programs being executed of transitioning to the hibernation state. When receiving a notification from each application program indicating that preparation for transitioning to the hibernation state is completed, the OS writes a system context to the main memory 13 and then saves the hibernation data of the main memory 13 in the SSD 19.

Subsequently, when setting is performed at the ACPI register 31 to enable transitioning to the hibernation state, the chip set 17 controls the power supply to the hibernation state via the EC 41. In this procedure, the status flag 129 is set or reset before trigger for shifting to the hibernation state is generated. In another method, when the trigger is generated, detection processing of the disk may be preformed and the status flag 129 may be set or reset, which delays time to transition to the power-saving state although.

In the procedure described above, the eject button 133 is operated to move the tray 113 to the open position and the ejection mechanism 119 is operated electrically. Thus, in the hibernation state, the loading state of the disk 111 and the setting state of the status flag 129 agree with each other. The ODD 35 is provided with a mechanical emergency button as well to forcibly remove the disk 111 for the emergency use when the ejection mechanism 119 and the power supply circuit 123 are out of order. Since the controller 125 cannot detect the movement of the tray 113 following the operation of the emergency button when the laptop PC is in the power-saving state, the state of the status flag 129 may not agree with the actual loading state of the disk 111. The following describes the operation procedure of the ODD for resumption while considering such a situation.

[Operation Procedure of ODD for Resumption]

FIG. 5 is a flowchart showing the operation procedure of the ODD 35 when the laptop PC 10 in the hibernation mode resumes. Block 401 corresponds to blocks 207 and 209 of FIG. 3, where power is turned on at the ODD 35 along with the starting of transitioning of the system to the power-on state, and the controller 125 is reset. When initialization of the SATA interface by the BIOS is finished, the controller 125 is requested from the BIOS to send a ready notification. At block 403, the controller 125 initializes the read/write circuit 115 and the servo mechanism such as the spindle motor 117 and makes the system ready to be accessible to the ODD 35.

For booting from the ODD 35, the tray 113 has to be loaded with a boot disk when the power of the system is turned on. However, the tray is not always loaded with a boot disk in the hibernation state. In this case, it is troublesome for a user to let the laptop PC transition to the power-on state once and then operate the eject button 133 to load the disk 111, and then let the laptop PC to the power-saving state again. Thus the user may press the power button 63 and immediately after the electricity supplied to the ODD 35, the user may operate the eject button 133 to move the tray 113 to the open position.

At block 405, the controller 125 allocates certain time before issuing a ready notification to the BIOS to a user to perform such an operation. When the user operates the eject button 133 at block 451 before the elapse of the certain time, the controller 125 moves the tray 113 to the open position. When the tray 113 moves to the open position, the controller 125 resets the status flag 129 at block 453 and the procedure returns to block 405.

On expiry of the certain time at block 405, the controller 125 determines the position of the tray 113 at block 407. When the tray 113 is at the open position, the procedure shifts to block 423 and when the tray 113 is at the close position, the procedure shifts to block 409. At block 423, the controller 125 sends an open notification to the BIOS, indicating that the tray 113 is at the open position. The BIOS processes the open notification at block 215 of FIG. 3.

At block 409, the controller 125 checks the status flag 129. When the status flag 129 is set and indicates not-loading of the disk 111, then the procedure shifts to block 433, and when the status flag 129 is reset and indicates loading of the disk 111, then the procedure shifts to block 411. At block 433, the controller 125 sends a ready notification indicating not-loading of the disk 111 to the BIOS without inspecting the loading state of the disk 111. Then, the BIOS processes this ready notification at block 231 of FIG. 3. To inspect the loading state of the disk 111 requires initialization and activation of the read/write circuit 115 and the servo mechanism such as the spindle motor 117, and so takes predetermined time. On the other hand, the process at blocks 409 and 433 can be finished in a short time because they are before inspection of the loading state of the disk 111.

When a user operates an emergency button in the hibernation state to move the tray 113 to the open position and load the disk 111 therein, the controller 125 does not recognize such movement to the open position, and so the status flag 129 is not reset. Thus although the disk 111 is loaded, the controller 125 sends a ready notification indicating not-loading of the disk 111 to the BIOS. Since the BIOS processes this notification in the path from block 231 to block 235 of FIG. 3, booting cannot be performed from the ODD 35 at this time even when a boot disk is loaded in the ODD 35.

The controller 125 issues a ready notification indicating not-loading of the disk 111 at block 433 and thereafter performs detection processing of the disk 111 at block 435. Since a ready notification is already sent at block 433, the resume time will not be delayed by the detection processing of the disk 111 at this time. When the user operates an emergency button to move the tray 113 to the open position and load the disk 111 therein when the status flag 129 is set, the controller 125 can detect the loading of the disk 111 at block 437. The controller 125 detecting the loading of the disk 111 resets the status flag 129 at block 439.

At this time, the BIOS receives ready notifications from all devices including the ODD 35 at blocks 211 and 213 of FIG. 3, and passes the control to the OS at block 237. When the BIOS passes the control to the OS, the BIOS notifies the OS of not-loading of the disk at the ODD 35. Then, the OS displays not-loading of the disk at an icon of the ODD 35. At block 441, the controller 125 notifies the OS of loading of the disk 111. The OS receiving the notice displays the loading of the disk 111 at an icon of the ODD 35.

Thus in the case of the loading of the disk 111 using an emergency button, the booting from the ODD 35 cannot be performed. In this case, however, start-up from the hibernation state or from the power-off state performed again after resetting of the status flag 129 at block 439 allows the procedure to shift to blocks 411 and 413, thus enabling booting from the ODD 35. When the controller 125 determines that the disk 111 is loaded at block 409, then the controller 125 performs detection processing of the disk 111 at block 411. At block 413, the controller 125 sends a ready notification indicating loading of the disk 111 to the BIOS. Then the BIOS processes this ready notification at blocks 231 and 233 of FIG. 3.

The disk 111 may be removed by the operation of an emergency button in the hibernation state. When the controller 125 inspects the loading state of the disk 111 and determines that the disk 111 is not loaded actually at block 411, the controller 125 can send a ready notification indicating not-loading of the disk 111 at block 413. In this case, however, the procedure undergoes the detection processing of the disk 111 at block 411 and the path from block 231 to block 233 of FIG. 3, and so the resume time cannot be shortened. Note that since an emergency button is operated less frequently, the resume time will not be lengthened in many cases.

In the procedure of FIG. 5, when the status flag 129 is set, a ready notification indicating not-loading of the disk 111 is issued to the BIOS without performing detection processing of the disk 111, and so resumption can be finished in a short time in many cases where the disk 111 is not loaded in the tray 113. When the ODD 35 is loaded with a boot disk, the booting enables from the ODD.

[Method by BIOS to Store Status Flag in Nonvolatile Memory]

That is the description of an example where the status flag 129 is set at the flash memory 127 of the ODD 35, and the status flag may be set by the BIOS at the BIOS_ROM 33 or at another nonvolatile memory (NVRAM) the BIOS can access during resumption. The NVRAM to set a status flag may be connected to the chip set 17 shown in FIG. 1 via the interface of LPC. The operation procedure in that case is described below, with reference to FIGS. 6 to 8. The procedure of FIGS. 6 to 8 is common to the procedure of FIGS. 3 to 5 in many respects, where like reference numerals refer to like parts to omit the descriptions.

Figure 6:
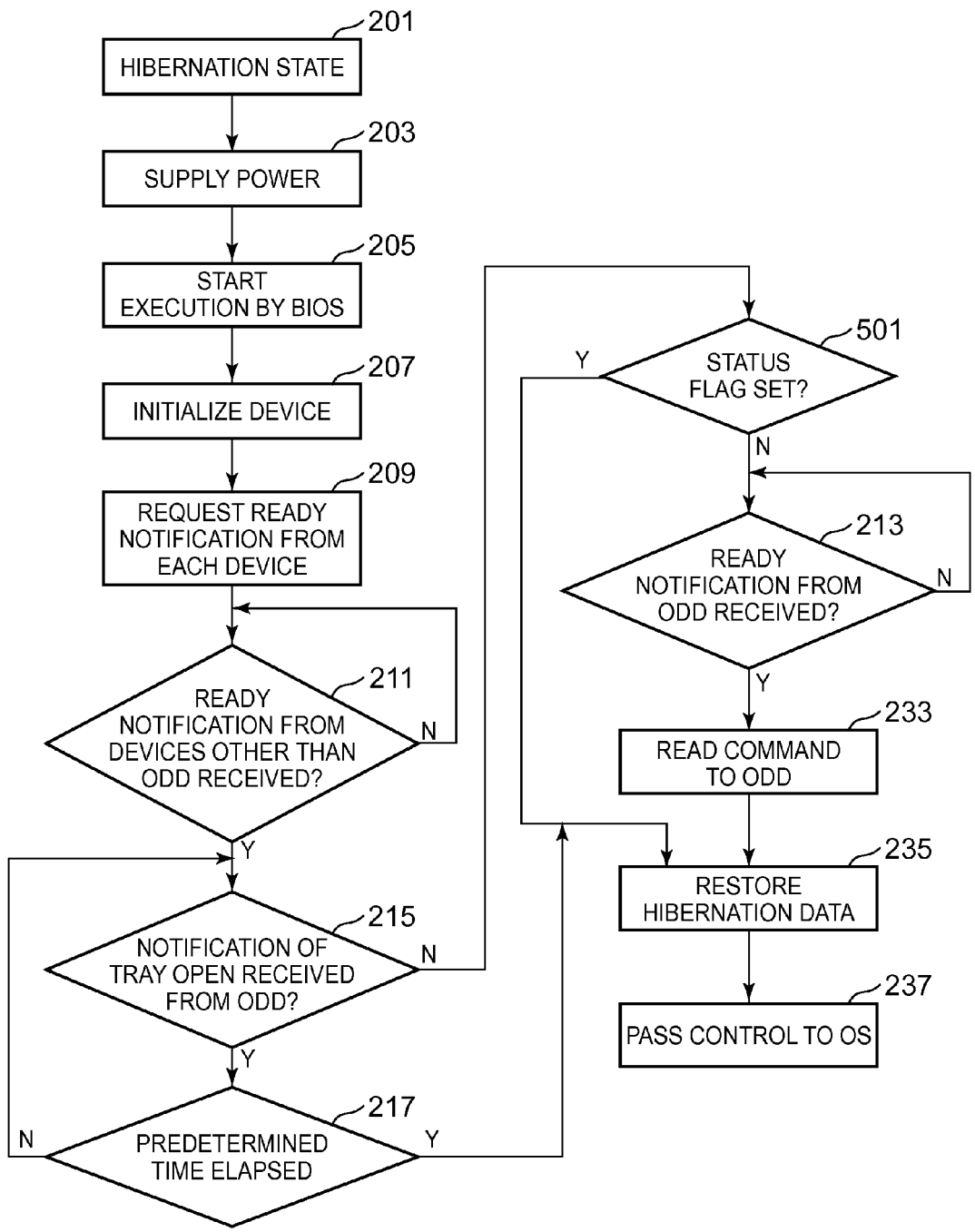
FIG. 6 is a flowchart corresponding to FIG. 3, showing the procedure executed by the BIOS when the laptop PC in the hibernation state resumes.

FIG. 6 is a flowchart corresponding to FIG. 3, showing the procedure executed by the BIOS when the laptop PC 10 in the hibernation state resumes. At block 501, the BIOS checks the status flag of the NVRAM. When the BIOS confirms the status flag being set and then determines that the disk 111 is not loaded or considers that a ready notification indicating not-loading of the disk 111 is received, the procedure shifts to block 235. At block 501, when the BIOS confirms the status flag being reset, the procedure shifts to block 213. When the status flag is set in the procedure of FIG. 6, the BIOS can perform processing at block 235 without waiting for a ready notification from the ODD 35.

Figure 7:
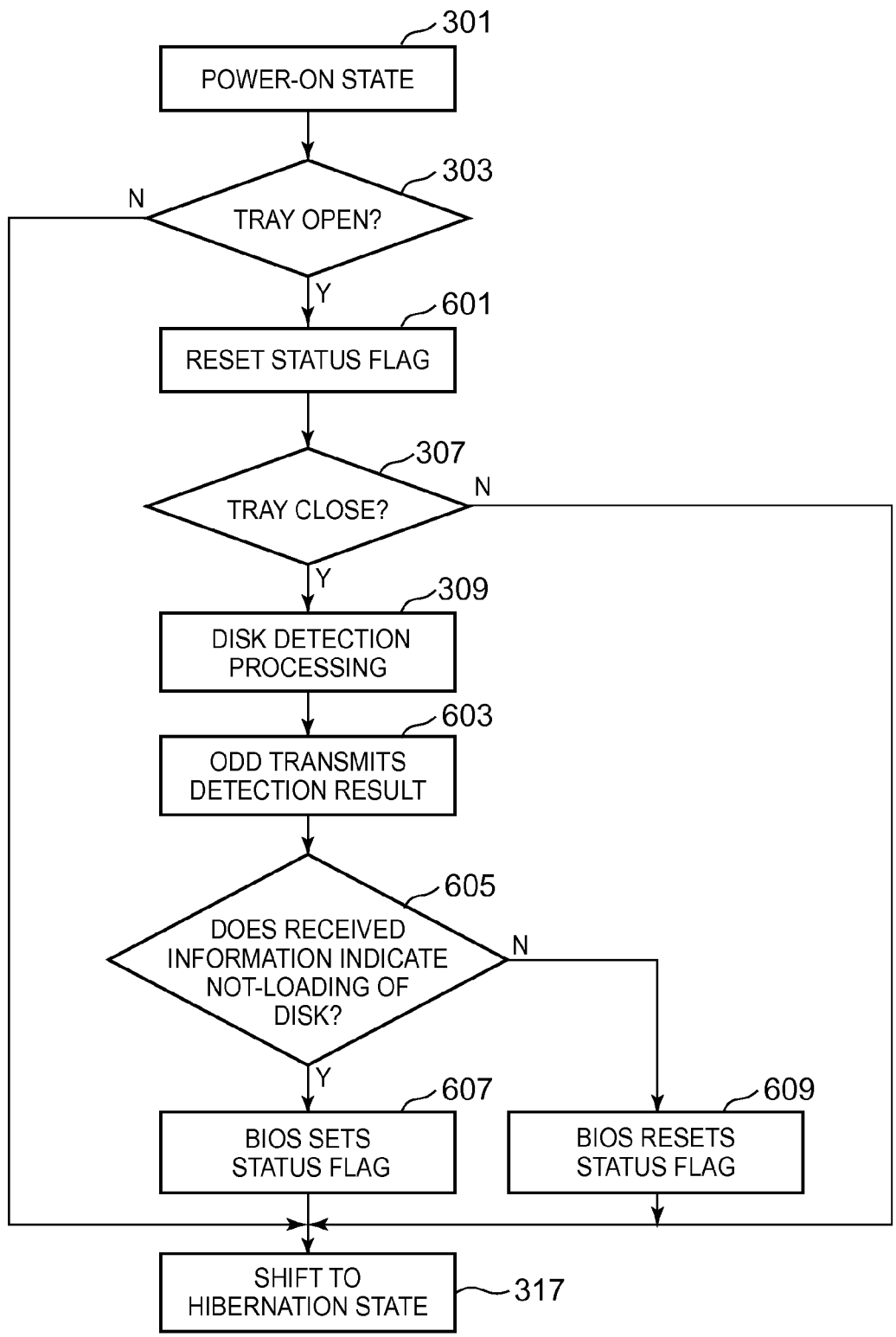
FIG. 7 is a flowchart corresponding to FIG. 4, showing the procedure executed by the BIOS receiving information from the ODD to set a status flag at the NVRAM.

FIG. 7 is a flowchart corresponding to FIG. 4, showing the procedure executed by the BIOS that receives information from the ODD 35 and sets a status flag at the NVRAM. At block 601, the OS or the BIOS receiving a notification of the movement of the tray 113 to the open position from the controller 125 resets the status flag at the NVRAM. At block 603, the OS or the BIOS receives information indicating loading of the disk or not-loading of the disk from the ODD 35. The OS or the BIOS receiving information indicating not-loading of the disk 111 from the ODD 35 at block 605 sets the status flag at the NVRAM at block 607. The OS or the BIOS receiving information indicating loading of the disk 111 from the ODD 35 at block 605 resets the status flag at the NVRAM at block 609.

Figure 8:
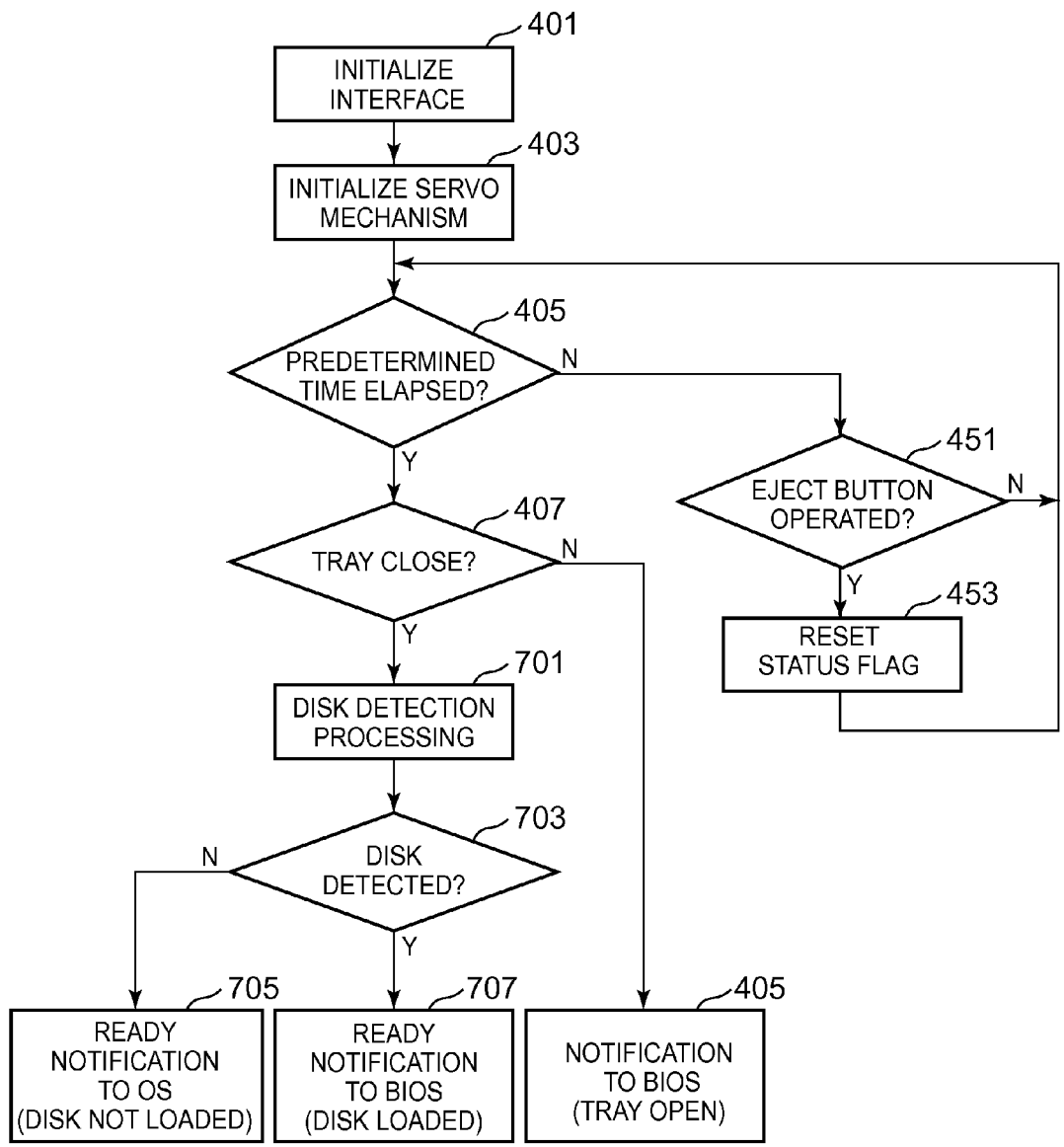
FIG. 8 is a flowchart corresponding to FIG. 5, showing the operation procedure by the ODD when the laptop PC in the hibernation state resumes.

FIG. 8 is a flowchart corresponding to FIG. 5, showing the operation procedure by the ODD 35 when the laptop PC 10 in the hibernation state resumes. At block 701, the controller 125 performs detection processing of the disk 111 and the procedure proceeds to block 703. At this time, when the BIOS confirms the status flag being set at the NVRAM at block 501 of FIG. 6, then procedure proceeds without waiting for a ready notification from the ODD 35 at block 235. When the BIOS confirms the status flag being reset, the procedure waits for a ready notification from the ODD 35 at block 213.

At block 703, when it is determined as not-loading of the disk 111, the procedure shifts to block 705 and then the controller 125 sends a ready notification indicating not-loading of the disk 111 to the OS. When the status flag is set at this time, the control of the resumption is passed to the OS at blocks 501 and 237 of FIG. 6 without waiting for a ready notification. When the status flag is reset, the OS sets a status flag at the NVRAM by the procedure at block 607 of FIG. 7.

In the procedure of FIGS. 6 to 8, the ODD 35 performs the same operation as conventional one to initialize the servo mechanism and perform detection processing of the disk 111 during resumption. The BIOS, however, can perform resume processing without waiting for a ready notification form the ODD 35 when the status flag shows not-loading of the disk 111. At this time, the BIOS sends information indicating not-loading of the disk 111 to the OS. The OS receiving this information indicating not-loading of the disk 111 from the BIOS displays an icon for not-loading of the disk.

When the disk 111 is loaded by operating an emergency button in spite of the status flag being set at block 501 of FIG. 6, the control of resume processing is shifted to the OS at block 237 when the ODD 35 sends the ready notification at block 707. When the OS receives a ready notification showing loading of the disk 111 later, then the display of the icon is changed.

When the disk 111 is not loaded by operating an emergency button in spite of the status flag being reset at block 501 of FIG. 6, the procedure shifts to block 235 when the BIOS determines that data of the disk 111 cannot read by the procedure at blocks 213 and 233. In this case, the procedure waits for a ready notification from the ODD 35 in spite of the disk 111 not loading. However, since an emergency button is operated less frequently, the resume time can be shortened in many cases.

[Others]

That is the description exemplifying the ODD as a device as a bottleneck to shorten the resume time, and the present invention is applicable to a device including another removable medium such as a tape drive as well that is used by loading a cartridge-type tape therein. The above description exemplifies a storage device that is a boot drive, and the present invention is applicable to a normal disk drive as well other than the boot drive.

The power-saving state where the present invention is applicable is not limited to the hibernation state, and is applicable to another power-saving state such as a suspend state or a type that, after the OS makes the laptop PC to the suspend state, the BIOS makes it transition to the hibernation state. The ODD 35 is not limited to a type connecting to the SATA controller 29, and may be connected to another type of controller such as the USB controller 25.

The ODD 35 is not limited to a type that is mounted at the case of the laptop PC 10, and may be a type that is connected via a network or is connected to a port provided at the case of the laptop PC. According to the present invention, the laptop PC 10 loaded with the ODD 35 can satisfy the resume time requested by Windows (registered mark) 8 to resume from the power-saving state where hibernation data is stored in the SSD.

DESCRIPTION OF SYMBOLS

10 Laptop PC
17 Chip set
111 Disk
113 Tray
127 Flash memory
133 Eject button

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising: setting identification information to indicate a loading state of a removable medium of a removable medium device prior to shifting to a power-saving state;
  causing a computer with which the removable medium device is connected to wait for a ready notification from the removable medium device during resumption from the power-saving state; and
  without performing a detection processing of the removable medium during the resumption from the power-saving state, sending a ready notification indicating not-loading of the removable medium responsive to a determination that the identification information indicates not-loading of the removable medium; and resuming the computer from the power-saving state responsive to the ready notification.

2. The method of claim 1, wherein the removable medium device is an optical disk drive capable of loading a boot disk therein.

3. The method of claim 2, further comprising setting the identification information to indicate loading of the removable medium when an eject button is operated within a predetermined time from the resumption of the removable medium device.

4. The method of claim 3, wherein the power-saving state is a hibernation state, and further comprising, restoring hibernation data to a main memory responsive to receiving a ready notification indicating not-loading of the removable medium from the removable medium device.

5. The method of claim 1, further comprising the removable medium device inspecting a loading state of the removable medium and sending a ready notification indicating loading of the removable medium to the firmware responsive to determining that the identification information indicates loading of the removable medium.

6. The method of claim 1 further comprising the removable medium device inspecting a loading state of the removable medium responsive to sending a ready notification indicating not-loading of the removable medium.

7. A computer, comprising:
a removable medium device, to which a removable medium is loadable, including a first nonvolatile memory storing identification information indicating a loading state of the removable medium; and
a second nonvolatile memory storing firmware therein, the computer programmed to send, without performing a detection processing of the removable medium during resumption from a power-saving state, a ready notification indicating not-loading of the removable medium to the firmware during the resumption from the power-saving state when it is determined that the identification information indicates not-loading of the removable medium.

8. The computer of claim 7, wherein during resumption from the power-saving state, the removable medium device inspects a loading state of the removable medium and then sends a ready notification indicating loading of the removable medium to the firmware when it is determined that the identification information indicates loading of the removable medium.

9. The computer of claim 7, wherein the removable medium device is an optical disk drive including a tray to load a boot disk therein.

10. The computer of claim 9, further comprising the firmware determining a not-loading state of the disk on the tray and subsequently continuing processing when the tray is at an open position for a predetermined time.

11. The computer of claim 9, wherein upon resumption from the power-saving state, when an eject button is operated within a predetermined time after power is supplied to the removable medium device, the tray is moved to an open position.

12. The computer of claim 7, wherein the power-saving state is a hibernation state, and the computer includes a solid state drive to store hibernation data therein.

13. A method comprising:
setting identification information indicating a loading state of a disk at a nonvolatile memory during a power-on state;
checking identification information at the nonvolatile memory when resumption is performed from a power-saving state; and
sending a ready notification indicating not-loading of the disk to the system without performing a detection processing of the disk during the resumption from the power-saving state, when the identification information indicates not-loading of the disk.

14. An optical disk drive to be connected to a computer capable of shifting to a power-saving slate, comprising:
a disk;
a servo mechanism;
a nonvolatile memory storing identification information indicating a loading state of the disk; and
a controller configured to set the identification information at the nonvolatile memory prior to shifting of the computer to the power-saving state, and during resumption from the power-saving state, when it is determined that the identification information indicates not- loading of the disk, to send a ready notification indicating not-loading of the disk to a system without performing a detection processing of the disk during the resumption from the power-saving state.

15. A method comprising:
receiving information indicating a loading state of a removable medium from a removable medium device and setting identification information prior to shifting to a power-saving state;
waiting for a ready notification from the removable medium device during resumption from the power-saving state; and
without performing a detection processing of the removable medium during the resumption from the power-saving state, sending ready notification indicating not-loading of the removable medium during the resumption from the power-saving state responsive to determining that the identification information indicates not-loading of the removable medium.

16. The method of claim 15, further comprising, causing the computer to exert a function of performing the resume processing when it is determined that the identification information indicates loading of the removable medium and the ready notification has been received.

17. The method of claim 15, further comprising the removable medium device detecting a loading state of the removable medium and sending information indicating loading or not-loading of the removable medium to the firmware.

18. A computer, comprising:
a removable medium device, to which a removable medium is loadable;
a first nonvolatile memory storing identification information indicating a loading state of the removable medium therein;
a second nonvolatile memory storing firmware configured to perform resumption processing when the computer resumes from a power-saving state; and
wherein the computer is programmed such that during resumption from the power-saving state, when it is determined that the identification information indicates not-loading of the removable medium, the firmware causes the computer to recognize a reception of a ready from the removable medium device and perform the resumption processing without performing a detection processing of the removable medium during the resumption from the power saving state.

19. The computer of 18, wherein during resumption from the power-saving state, when it is determined that the identification information indicates loading of the removable medium, the firmware causes the computer to exert a function of, after receiving a ready notification indicating loading of the removable medium, performing the resume processing.

20. A non-transitory computer readable storage medium storing a computer program executable on a processor that causes a computer connected to a removable medium device to which a removable medium is loadable to execute operations comprising:
   receiving information indicating a loading state of the removable medium from the removable medium device and setting identification information prior to shifting to a power-saving state;
   waiting for a ready notification from the removable medium device during resumption from the power-saving state; and
   without performing a detection processing of the removable medium during the resumption from the power-saving state, recognizing a reception of the ready notification and performing the resumption processing when it is determined that the identification information indicates not-loading of the removable medium.

* * * * *